Figure 3:
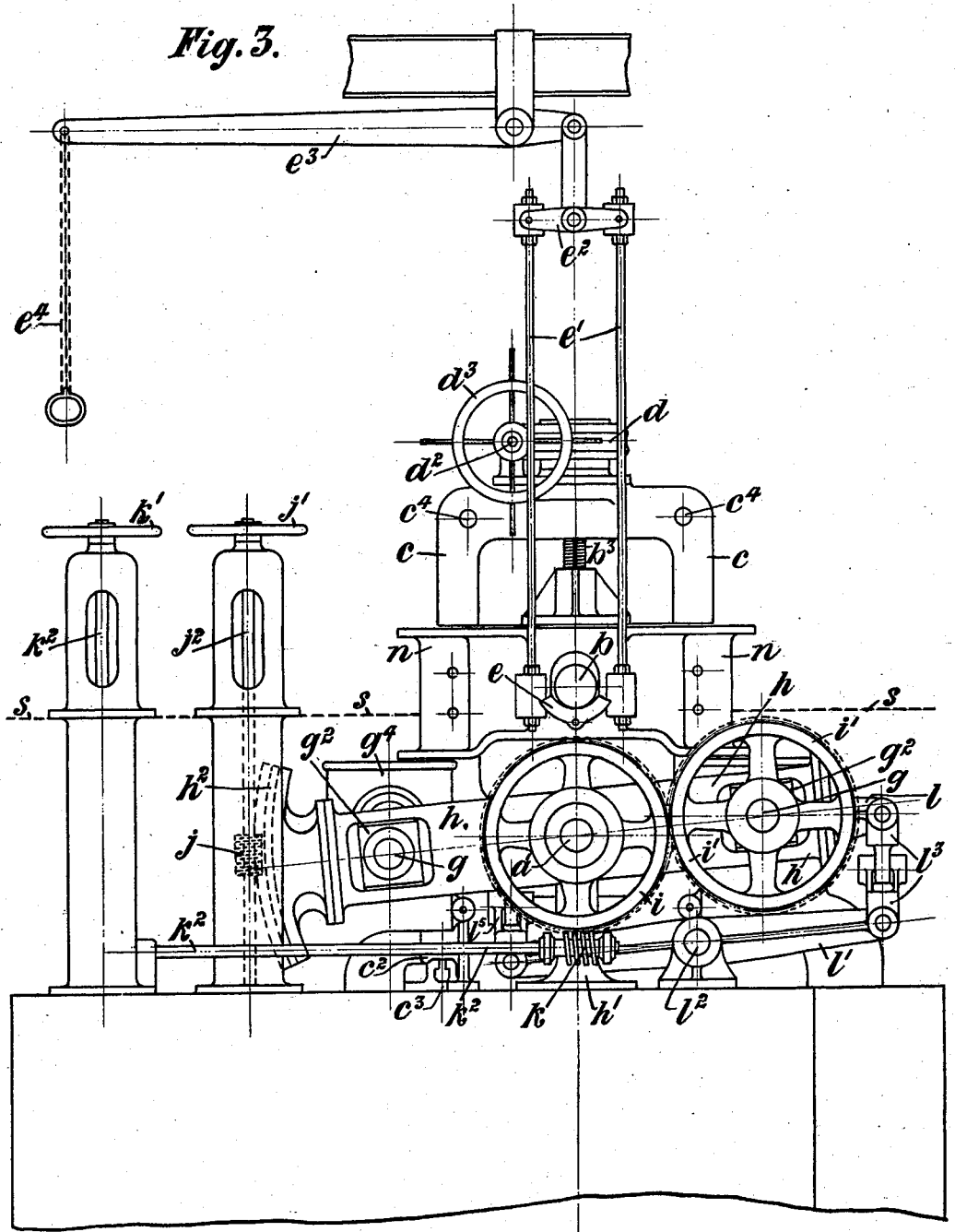

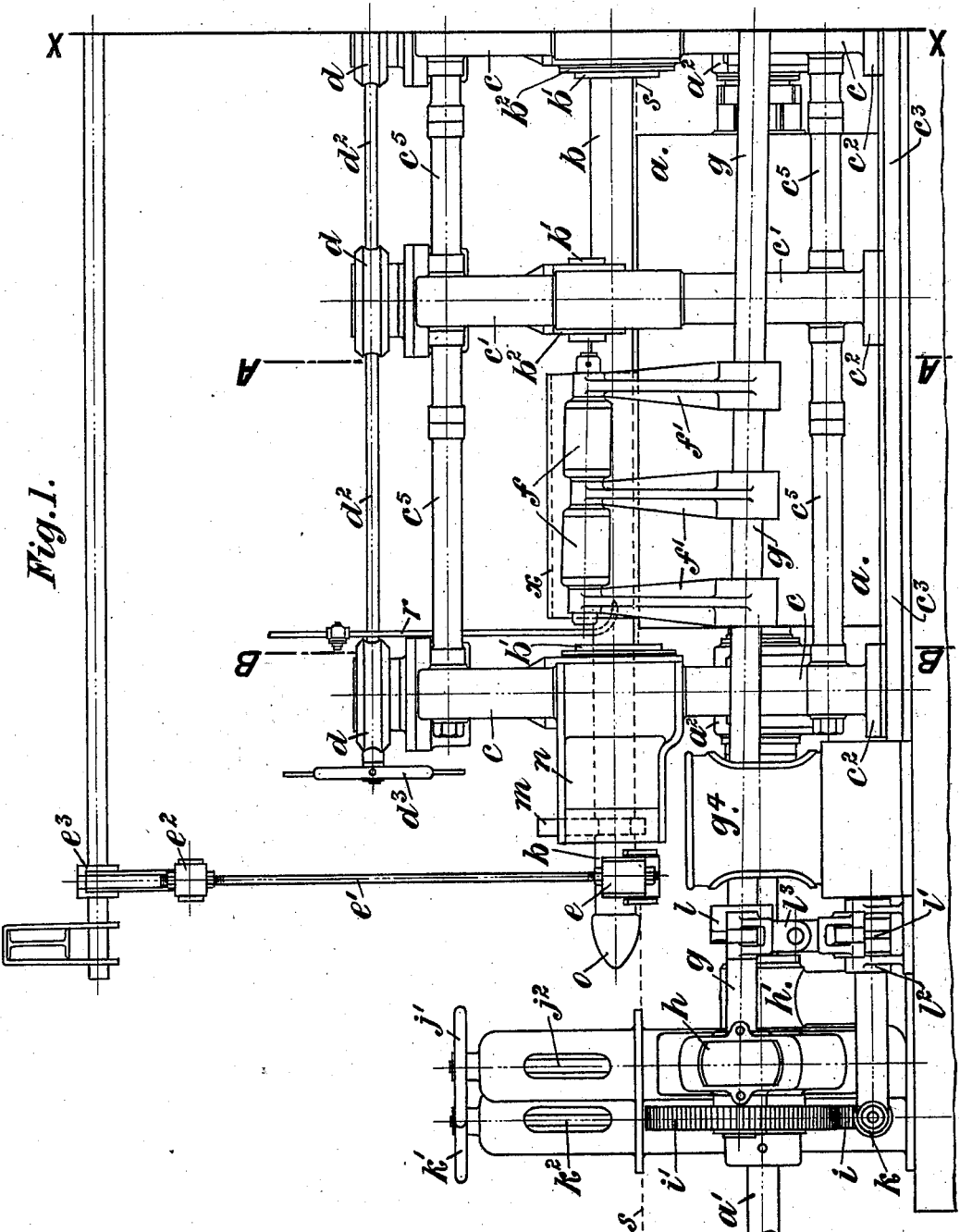

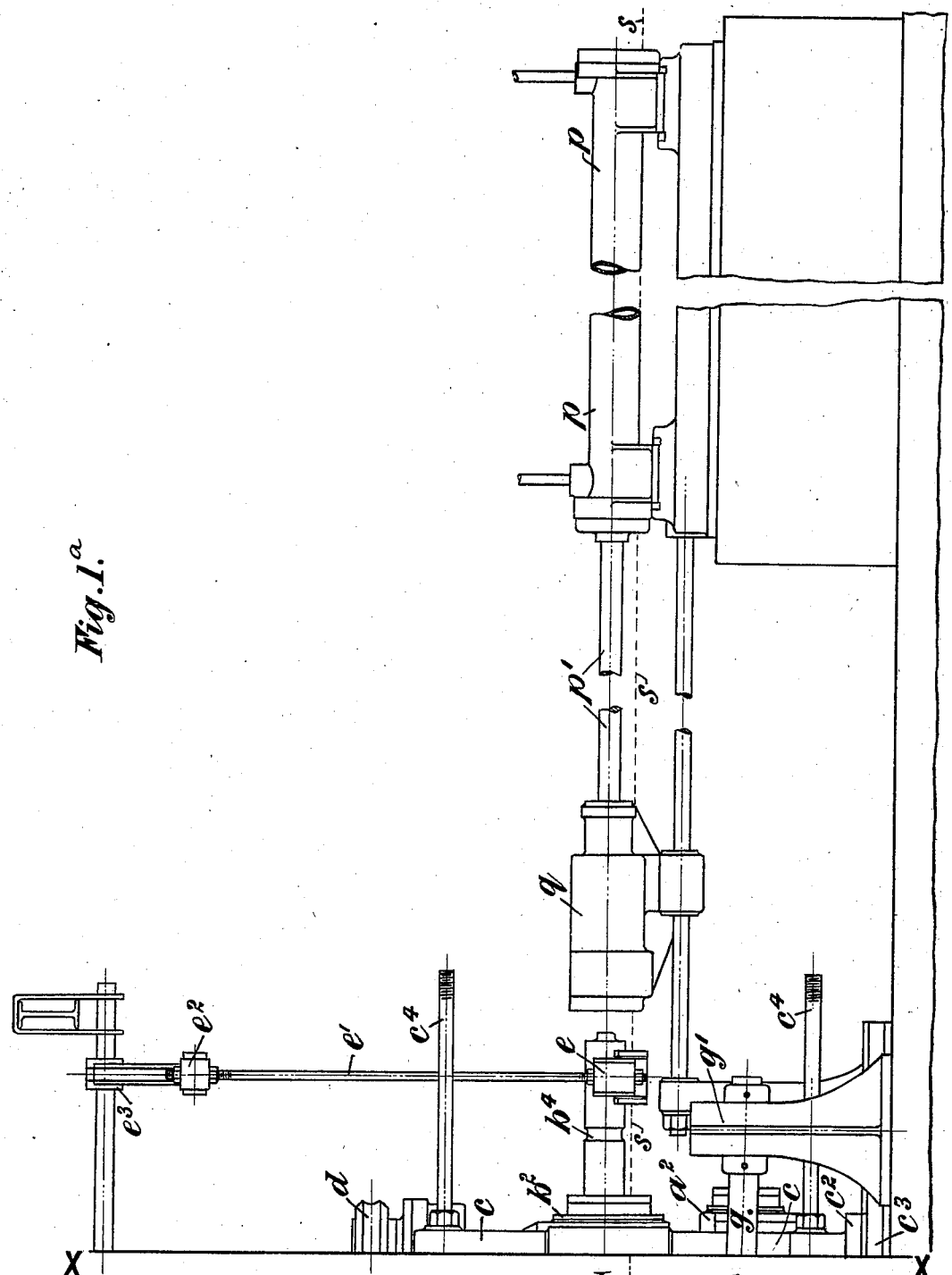

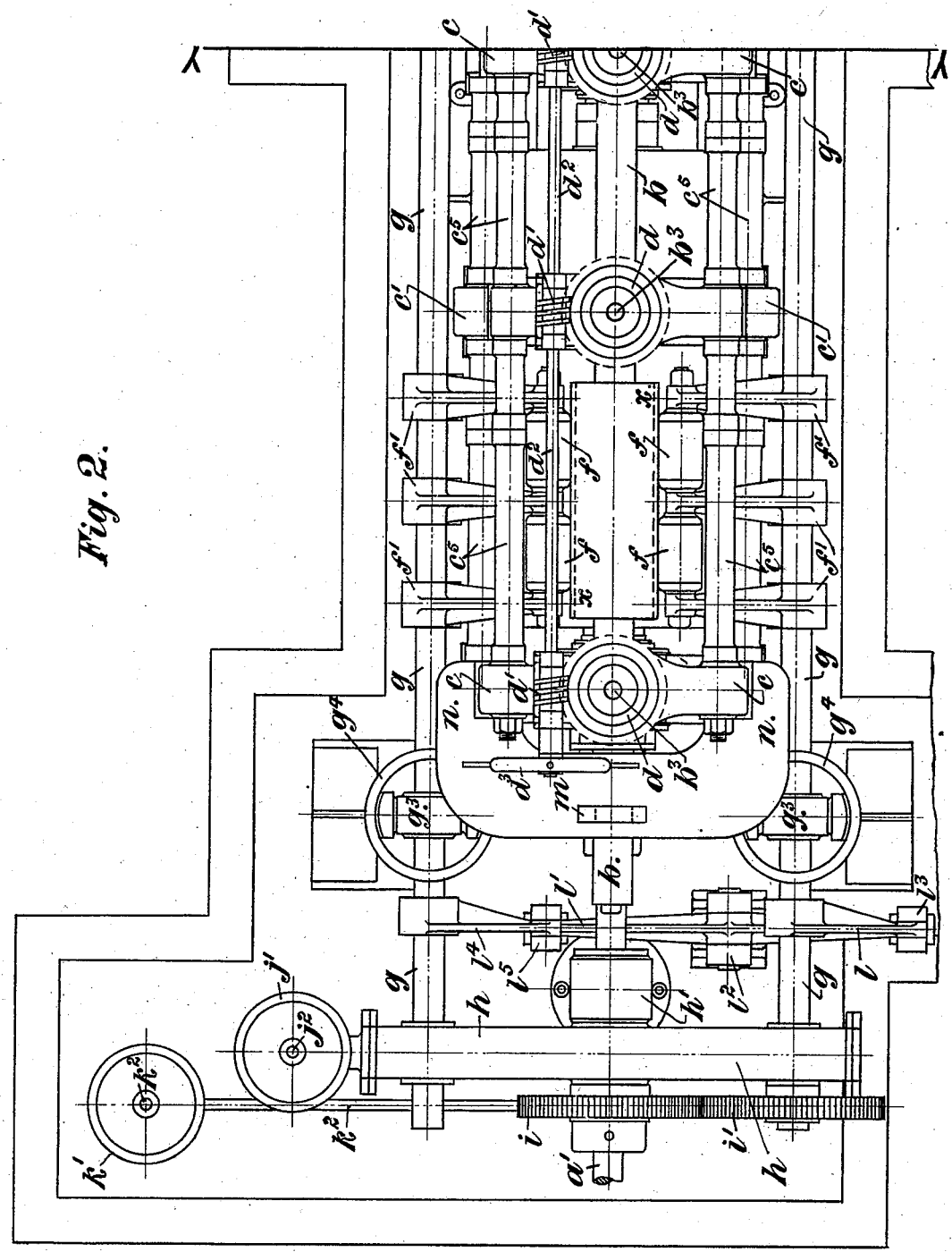

No. 700,361. Patented May 20, 1902.
B. F. McTEAR.
MACHINE FOR MAKING SEAMLESS TUBES OR HOLLOW ARTICLES.
(Application filed Aug. 15, 1901.)
(No Model.) 13 Sheets—Sheet 4.
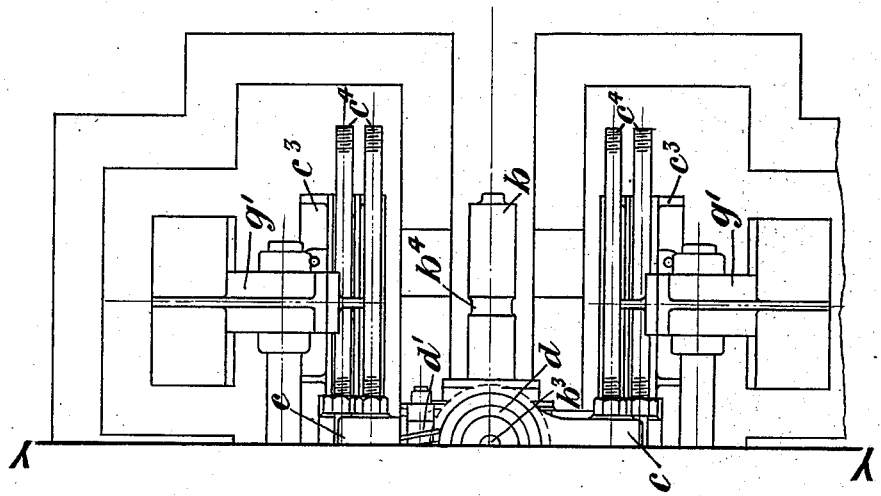
Fig. 2ª.

No. 700,361. Patented May 20, 1902.
B. F. McTEAR.
MACHINE FOR MAKING SEAMLESS TUBES OR HOLLOW ARTICLES.
(Application filed Aug. 15, 1901.)
(No Model.) 13 Sheets—Sheet 5.

Witnesses:
E. J. P. Bolton
Geo. W. Aldow Jr.

Inventor:
Balfour Fraser McTear
By Richards & Co
his Attorneys.

No. 700,361. Patented May 20, 1902.
B. F. McTEAR.
MACHINE FOR MAKING SEAMLESS TUBES OR HOLLOW ARTICLES.
(Application filed Aug. 15, 1901.)
(No Model.) 13 Sheets—Sheet 6.
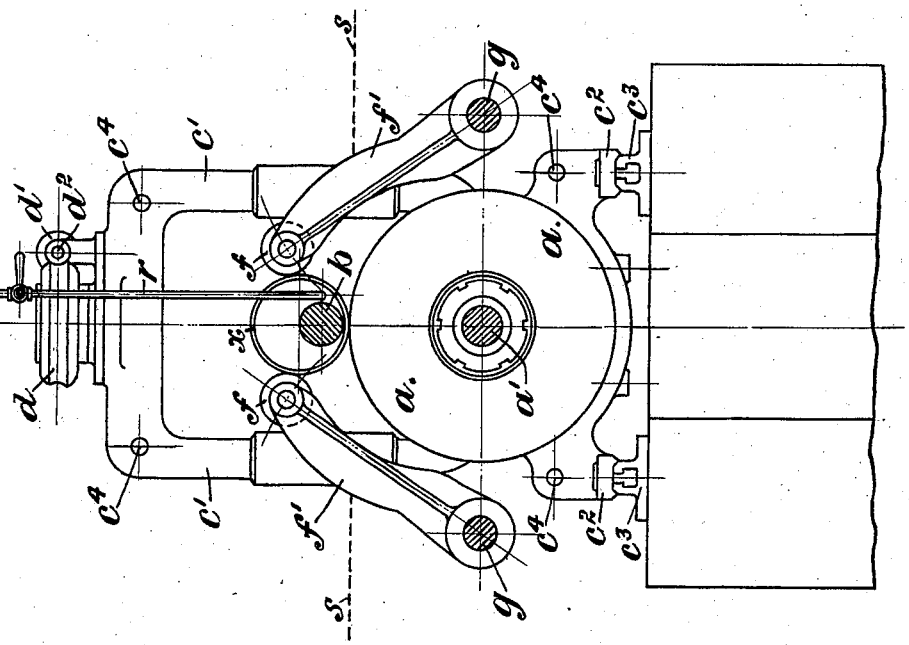
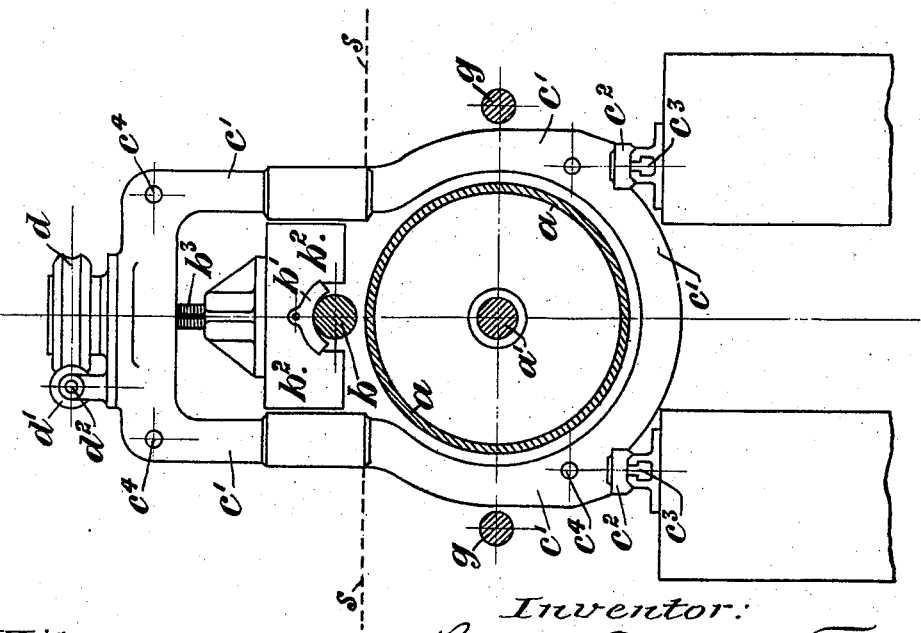
Witnesses:
Inventor:
Balfour Fraser McTear
By Richards & Co
his Attorneys.

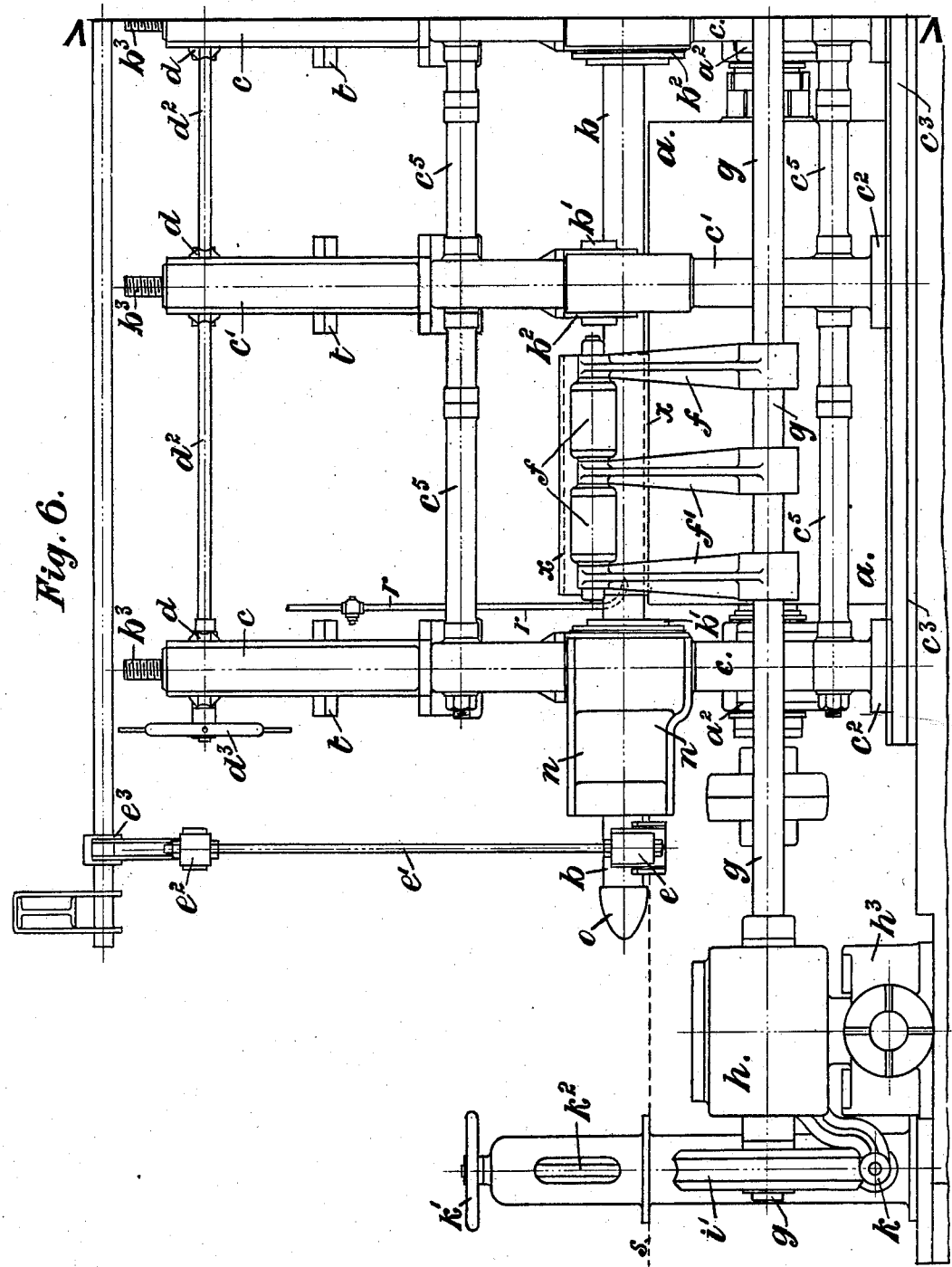

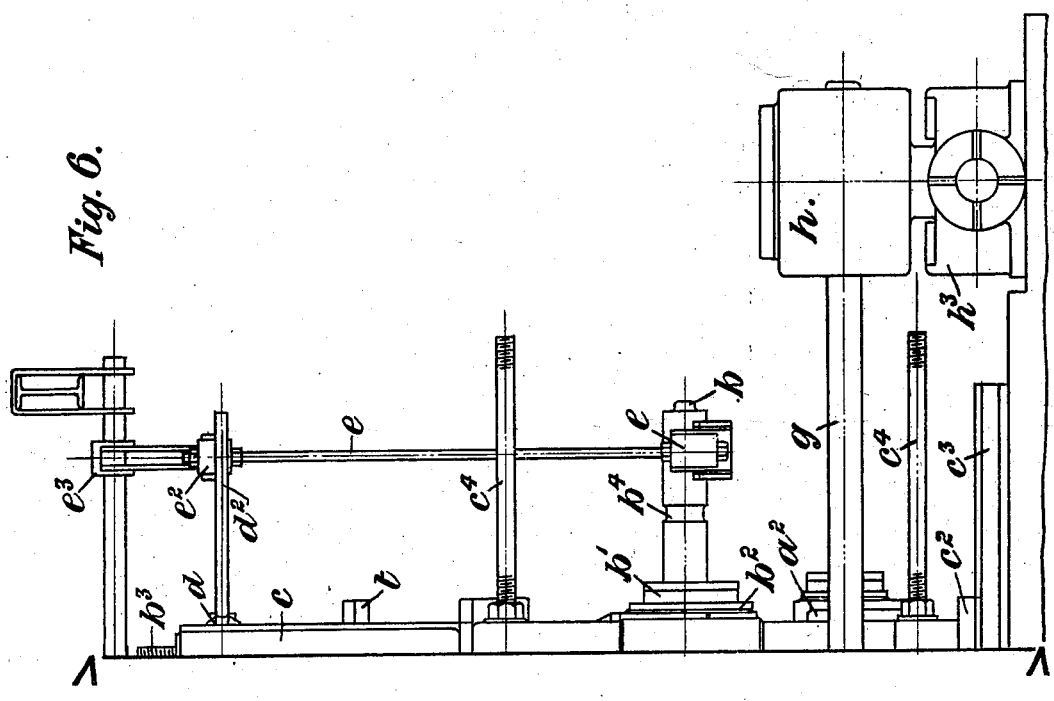

No. 700,361. Patented May 20, 1902.
B. F. McTEAR.
MACHINE FOR MAKING SEAMLESS TUBES OR HOLLOW ARTICLES.
(Application filed Aug. 15, 1901.)
(No Model.) 13 Sheets—Sheet 9.

No. 700,361. Patented May 20, 1902.
B. F. McTEAR.
MACHINE FOR MAKING SEAMLESS TUBES OR HOLLOW ARTICLES.
(Application filed Aug. 15, 1901.)
(No Model.) 13 Sheets—Sheet 10.
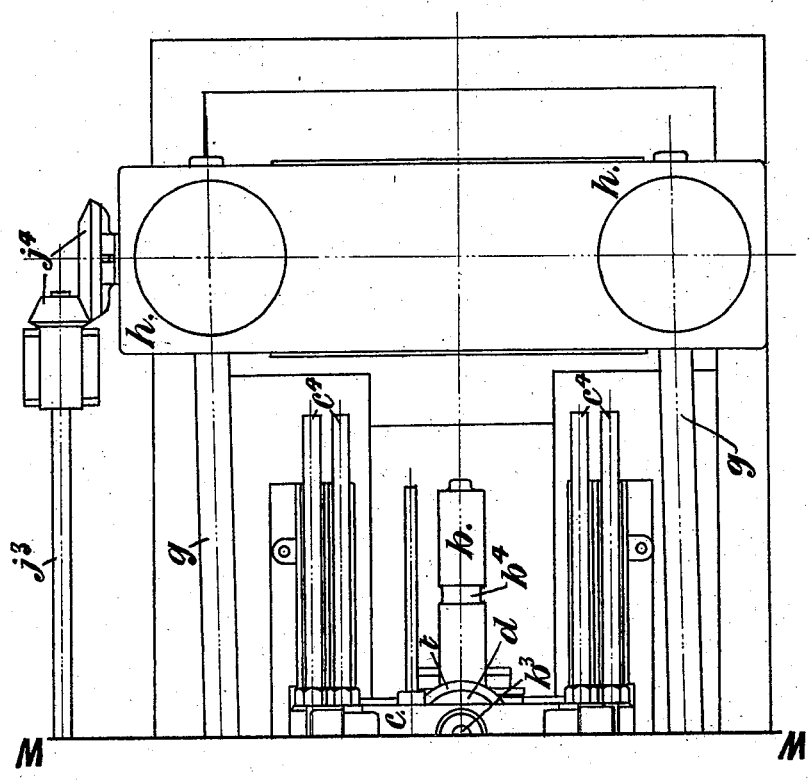

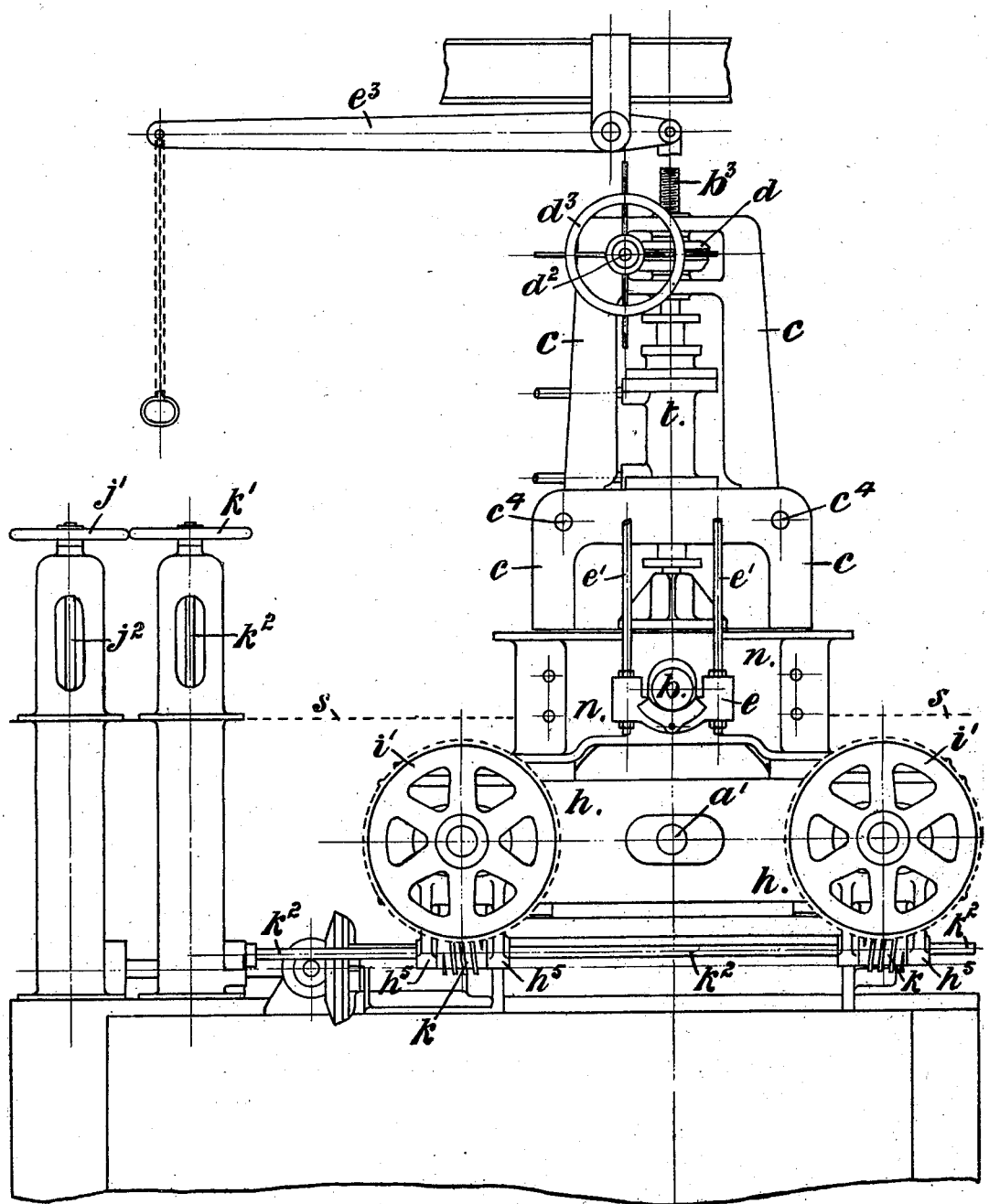

No. 700,361. Patented May 20, 1902.
B. F. McTEAR.
MACHINE FOR MAKING SEAMLESS TUBES OR HOLLOW ARTICLES.
(Application filed Aug. 15, 1901.)
(No Model.) 13 Sheets—Sheet 12.
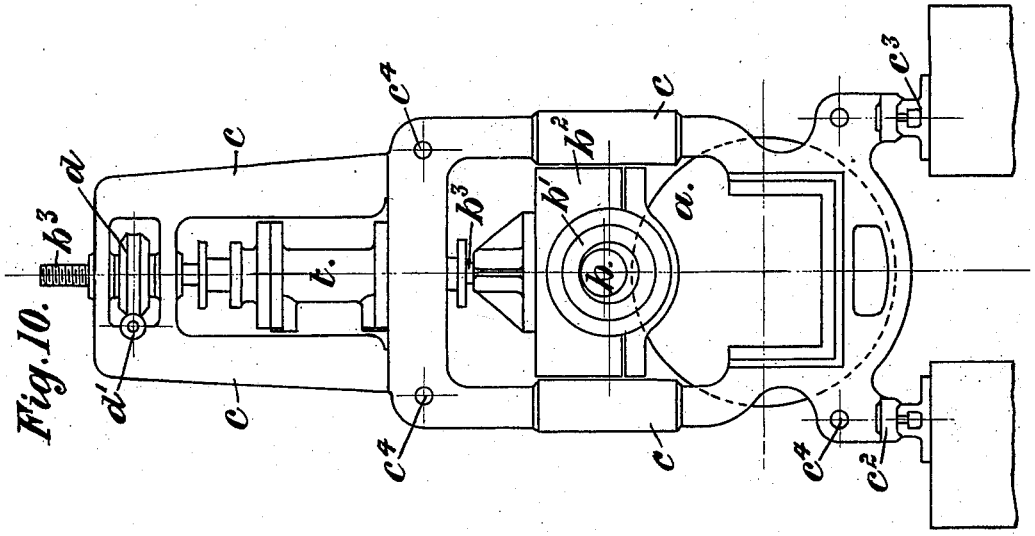
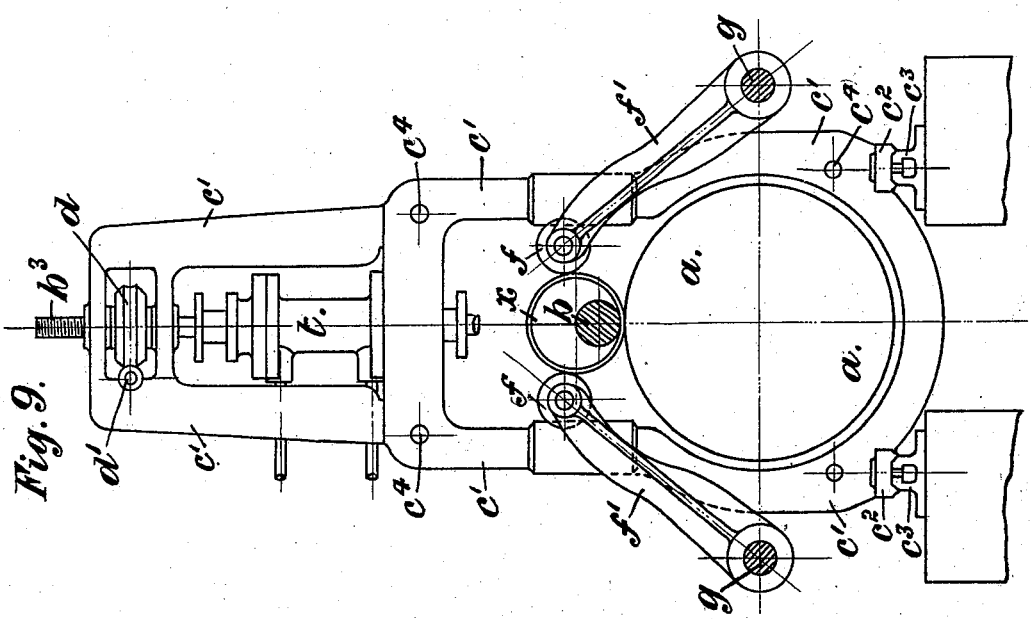
Witnesses:
Inventor:
Belfour Fraser McTear
By Richards & Co
his Attorneys.

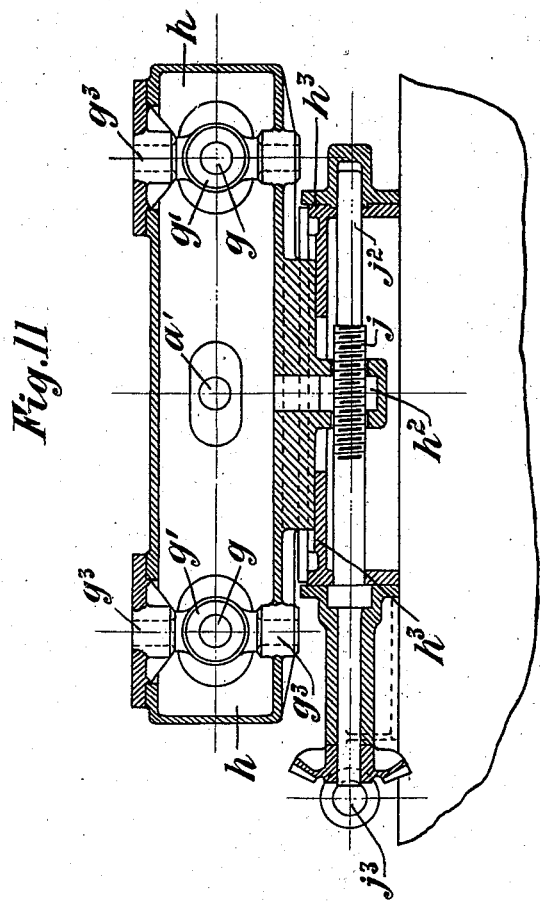

United States Patent Office.

BALFOUR FRASER McTEAR, OF RAINHILL, ENGLAND.

MACHINE FOR MAKING SEAMLESS TUBES OR HOLLOW ARTICLES.

SPECIFICATION forming part of Letters Patent No. 700,361, dated May 20, 1902.

Application filed August 15, 1901. Serial No. 72,092. (No model.)

*To all whom it may concern:*

Be it known that I, BALFOUR FRASER MC-TEAR, a subject of the King of England, and a resident of Rainhill, in the county of Lancaster, England, have invented new and useful Improvements in and Connected with the Manufacture of Seamless and Weldless Tubes or Hollow Bodies, of which the following is a specification.

This invention has reference mainly to the manufacture of hollow cylinders or cylindrical bodies of steel and other hard metals or alloys; and it has more particularly for its objects and effects to provide improved machinery whereby the crude or rough hollow billets or bodies (generally externally cylindrical bodies) while in a highly-heated or glowing state have the thicknesses of their walls reduced and their diameter increased and are rendered truly cylindrical and of uniform thickness annularly and throughout their length and rapidly in one heat, while at the same time a smooth and fine surface-finish is imparted to the article. All the operations are carried on in the one machine.

According to this invention a hollow billet or cylinder produced in any known way and having its walls or shell of considerable thickness, and may be of a non-uniform thickness, is spun or revolved at a high velocity and operated upon by rollers acting and pressing on its interior and exterior surfaces, the treatment being of the character of annular or circular "spinning." The rollers which act internally and externally on the hollow body are horizontally arranged and adjusted relatively to one another by positive adjusting means, so that the distance between them and their action at every moment on the metal is controlled positively, and as they are pressed closer to one another and adjusted or held in any particular relative position the metal of the cylinder or hollow body being operated upon becomes reduced in thickness and uniformly reduced. Furthermore, when the adjusting means of the rollers is stationary the rollers will be held in the particular relative disposition and distance apart that they will have been adjusted and moved to and required. Hence the section of the metal or thickness annularly and at any point of the cylinder longitudinally after it has been operated upon and turned out of the machine is uniform throughout. In the operation of rolling and as the axes of the two rollers are made to approach each other by their being adjusted or moved in the manner referred to the thickness of the walls of the hollow body or cylinder becomes reduced, while the diameter is increased.

To guide or keep the cylinder in the required position in relation to the rolls—namely, in the vertical plane thereof—it is supported externally by guide-rollers on either side, and to prevent the tube produced being imperfectly cylindrical—that is, with portions which are not of the true radius of the tube—these supporting or guide rollers are made to bear on those parts of the periphery on either side which are near the horizontal plane of the cylinder; and as the diameter of the body increases these guide-rollers move outward in a path which is inclined from the horizontal and away from the internal roller, so that the points of bearing of the guide-rollers on the opposite sides of the tubular body shall remain at about near the horizontal diametrical plane of the tube throughout the whole of its progressive diametrical increase.

According to a further part of this invention the hollow body or cylinder under operation is made to move to and stand at any point longitudinally of the rollers, so that neither end will press or rub against the bearings. This is effected by adapting the axes of the guide-rollers to be capable of being moved out of the horizontal plane in either direction at will. When the rollers have been adjusted to produce the effect desired, they are kept in that position for the rest of the operation, or in lieu of the guide-roller axes being adjustable in relation to the horizontal plane they are adapted to be moved or adjusted in relation to the vertical plane, by which the same effect is obtained.

Further, according to this invention prior to the peripheral or circular rolling or spinning action of the hollow billet or body all the cinder and slag or scale is forced from the bore by the head or end of the inner roller by providing it with a suitable formation, such as a conical or plain or cupped head, and passing it longitudinally through the bore of the body by suitable means after it has been placed in position for rolling in this machine, and this may be done by a hydraulic ram or other suitable means, the head being made of slightly-larger diameter than the bore, so as to scrape on the inner surface, as described.

The complete set of operations performed on the body while in the course of manufacture or treatment in the machine is as follows: The rough pierced or hollow body or cylinder in a highly-heated or glowing state is placed in the machine (the internal roller being withdrawn longitudinally) and supported externally. This internal roller containing the head or tool on its end is then pressed longitudinally in the direction of the axis of the bore of the body and passed through it (the bore) removing in this passing all scale or other adhering and detachable matters on the inside of the body. The next action is, the bearings of this roller are brought into it by their adjusting means and the guide-rollers brought onto the external surface of the body, as above referred to. The machine is then started and is driven at a high velocity—say with a peripheral rate of speed of rollers and body under operation of about two thousand feet per minute. The bearings of the internal roller are now pressed down by their adjusting means, and the internal roller is thus brought closer to the external roller. Obviously as the distance between these two rollers becomes less the thickness of the metal body being operated upon becomes reduced and its diameter increased gradually, but quickly. During the progress of this increase the external supporting or guide rollers are moved outward mechanically until the required diameter and thickness are reached.

The effects described take place gradually, but rapidly, a rough billet being reduced in thickness and brought to the required thickness and uniform throughout in a very short time and in one heat. This is rendered capable of being done by the high rate of rotation or peripheral velocity at which the body is moved while under treatment, it being, in effect, a high-velocity spinning operation. The machine is then stopped, the movable or adjustable bearings taken off the internal roller, this roller withdrawn longitudinally from the finished tubular body or cylinder, and the tube or cylinder taken away. The machine is then ready to receive another rough pierced or hollow body.

The upper roller of the machine is relatively small and is not driven and is of a diameter which will enable it to pass longitudinally through the bore of the hollow billet or cylinder to be operated upon, while the lower and externally-operating one is of a relatively large diameter—namely, several times the diameter of the smaller one. This is the driven roller, and by it the high rate of peripheral speed or rotation of the article being operated on and rapidity of the action generally is accomplished. These rollers are supported in suitable bearings, the shaft of the lower one being held in plumber-blocks secured onto the bed of the frame, while the upper one is supported in bearings which are carried by and adjustable vertically within frames or housings and which also support the adjusting-gear at other parts. These bearings are preferably made of a radius larger than that of the roller which they support. In connection with this upper roller there exist suspended lower bearings, one at each end, outside the frames of the machine to hold the roller up in its upper bearings as and when required.

The guide or sectional side supporting-rollers are mounted on arms carried on shafts extending along each side of the machine, the supporting-shafts being disposed below and outside the horizontal and vertical planes in which the guide-rollers normally lie. By this relative arrangement the direction of movement of the guide or supporting rollers' axes as they are moved and recede from one another during the rolling operation of the body as its diameter increases will be an oblique one upward and outward, and being on arms the path described will be arcs of circles extending in an upward and outward direction from the internal roller-axes One object and effect of the relative arrangement of rollers referred to is that it provides an advantageous and convenient one for enabling the body to be easily manipulated. For instance, when the upper roller is withdrawn horizontally and longitudinally and the machine ready to receive a hot crude billet the upper surface of the large bottom driven roller and the sides of the two guide or supporting rollers constitute a cradle or bed into which the hot billet can be easily placed from above, and it will be held there in place by these rollers while the upper roller is passed longitudinally through it, and conversely the arrangement is equally advantageous and convenient for the removal of the articles at the completion of the operation.

In one construction of a machine three supporting-frames or housings and three upper bearings are employed, and these frames are fitted and adapted to be adjustable longitudinally on bed-girders at each side. The end of the lower large roller will lie between two outside frames or housings in which its bearings or plumber-boxes are disposed, while the middle frame or housing will stand astride the lower roller and be provided only with an upper half-bearing for supporting the upper roller. By this construction a machine is adapted to operate on short and long tubular bodies indifferently, as the intermediate frame and bearing can be adjusted anywhere, so as to support the upper shaft at as short a distance as possible or convenient from the end of the billet or body being rolled, and as this upper roller is necessarily small and more or less flexible the object of its support as close to the end of the work as possible is obvious.

In the drawings two modifications of machine comprising improvements according to my invention are given, and the invention will be further described with reference to these drawings.

Figure 7:
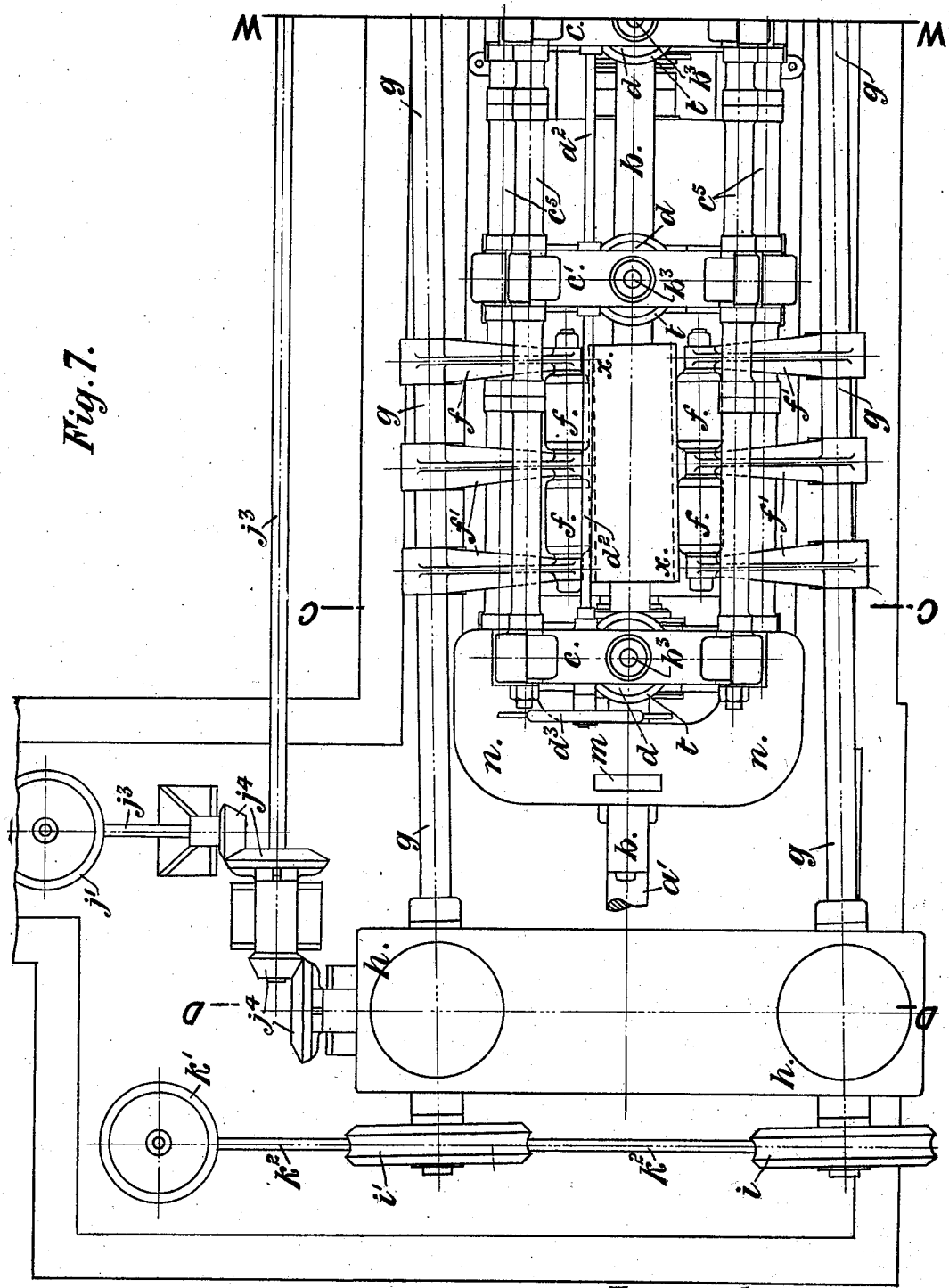

Figure 1 is a longitudinal elevation of one portion of the machine, and Fig. 1ª a similar view of the remaining portion, the figures being on too large a scale to permit showing on one sheet. Figs. 2 and 2ª together constitute a plan view, being on separate sheets for the same reason. Fig. 3 is an end view. Fig. 4 is a cross-section on line A A, and Fig. 5 a cross-section on line B B, of Fig. 1. Figs. 6 and 6ª constitute a longitudinal elevation of a modified form of machine. Figs. 7 and 7ª constitute a plan. Fig. 8 is an end elevation. Fig. 9 is a transverse section on line C C of Fig. 7. Fig. 10 is a back end elevation, and Fig. 11 a section on line D D of Fig. 7.

Referring in the first instance to Figs. 1 to 5, $a$ is the lower or external roller, and $b$ is the upper and smaller roller. $a'$ is the driven shaft by which the roller $a$ is revolved, and $a^2$ represents the bearings at either end of this roller, in which its shaft is supported. $b'$ represents the half-bearings, in which the shafts $b$ run, and $b^2$ are slide-blocks carrying the bearings $b'$. $c$ represents the two outer frames or housings carrying the bearings $b'$ of the upper roller-slides $b^2$ and their adjusting gear or mechanism, and $c'$ is the intermediate and longitudinally-adjusted housing or frame carrying the intermediate bearing $b'$. The hollow body or tube is designated $x$. The adjusting mechanism for moving the bearings $b'$ down and allowing them to be moved up comprises screwed rods $b^3$, fixed on the upper parts of the bearing, supporting slide-blocks $b^2$, worm-wheels $d$, mounted on the top of the frames or housings $c\ c'$, each having a threaded hole in its boss, the threads of which are adapted to mesh with threads of the rods $b^3$, worms $d'$, meshing the worm-wheels $d$, a rod $d^2$, carrying the worms $d'$, and a hand-actuating wheel $d^3$, fixed on the end of this rod. The threaded bore or hub of the worm-wheel $d$ acts as a nut on the threaded shafts $b^3$, and when they are revolved by the turning of the hand-wheel $d^3$ through the worms $d'$ in one or other direction the rods $b^3$ and bearings $b'$ are moved up and down, as the case may be. $e$ represents the half-bearings supporting the shaft $b$ from below for lifting it when the bearings $b'$ are raised, these bearings $e$ being supported by suspension-bars $e'$, cross-head $e^2$, and lever $e^3$, the latter being supported from above and adapted to be actuated by the chain $e^4$. The frames or housings $c\ c'$ have feet $c^2$, which rest on a longitudinal bed frame or girder $c^3$ on each side of the machine, and on these they may be adjusted longitudinally and then clamped or held down in any suitable way. The relative position and distance apart of the frames $c\ c'$ is further secured by tie-bolts $c^4$, which pass through them and tubular distance-pieces $c^5$ between the frames at the upper and lower corners. The guide or external side supporting-rollers are designated $f$, and $f'$ represents their supporting-arms. $g$ represents the shafts carrying the supporting-arms $f'$. $g'$ represents bearings at one end of the machine, carrying the back end of the shafts $g$, the part of the bearing in which the shafts work being capable of movement. $g^2$ represents the bearings supporting the other end of the shafts $g$. The bearings $g^2$ are carried in a vibrating beam $h$, they being supported at the top and bottom on slides in the beam, along which they are free to move longitudinally. The shafts $g$ have further guide-bearings $g^3$, mounted and adapted to slide up and down in columns $g^4$, acting as guides by which they (the shafts $g$) are prevented from moving in any but the vertical plane. The beam $h$ has a hollow trunnion on one side and is mounted by this trunnion in a bearing $h'$, and the shaft $a'$ of the roller $a$ passes through this hollow trunnion and beam and also through a spur-wheel $i$, loosely mounted on a hollow boss on the front face of the beam. The beam $h$ is oscillated when required in the bearings $h'$ by means of a worm $j$, worked by a hand-wheel $j'$ and shaft $j^2$ and a quadrantal rack $h^2$ on one end of the beam $h$. When the beam $h$ is moved in this way, it simultaneously raises one of the shafts $g$, carrying the guide-rollers $f$, and lowers the other, thereby inclining the axis of the one set of guide-rollers $f$ in one direction and the axis of the other set in the other direction. The effect of thus inclining the axes of these rollers to the horizontal plane is that they assume a "skew" arrangement in relation to the body $x$ being rolled, and as they press on the tube or body it is caused to stand in any position desired longitudinally of the rollers $a\ b$, and so obviate and counteract the tendency which the body or tube has in practice to move longitudinally and press up against the bearing-blocks $b^2$ or $b'$. Thus by adjusting the degree of inclination of the axes of the rollers $f$ to the horizontal plane the body may be made to be moved in either direction and be held in a position intermediate the bearings $b'$ of the roller $b$. The adjustment and control of the position of the body or tube $x$ longitudinally in the machine in this manner is important, inasmuch as if the body has its end pressed or rubbing severely against another body it disturbs the action and rolls out or burs the end edge and produces, moreover, a destructive action upon the machine. Besides the bodily or angular tilting of the shafts $g$ they receive axial oscillation for moving the guide-rollers $f$ inward and outward in relation to the vertical plane. The directions of these oscillations of the two shafts are of course opposite in order to simultaneously cause the rollers on the opposite sides to recede from one another and move away from the vertical plane of the machine and, vice versa, approach it. This movement is produced, primarily, from the spur-wheel $i$, which is loose on its hollow journal and is revolved from the worm $k$, operated by the hand-wheel $k'$ and shafting $k^2$. The motion imparted to the wheel $i$ is transferred to one of the shafts $g$ through a spur-wheel $i'$, fixed on this shaft and meshing with the spur-wheel $i$, and this motion again is transmitted from this shaft $g$ to the other shaft $g$ by the mechanism consisting of an arm $l$ on the primary shaft $g$, a lever $l'$, fulcrumed at $l^2$, a jointed link $l^3$, connecting $l$ with $l'$, an arm $l^4$ on the opposite shaft $g$, and a jointed link $l^5$, connecting $l'$ with $l^4$. The upper roller $b$ is held in place longitudinally by a horseshoe-shaped key $m$, which fits over a reduced portion of the roller, as shown in Figs. 1 and 2, the key being fitted and supported in a bracket $n$, fixed on the outside of one of the housings or frames $c$. When this key is in place, the shoulders on either side of the reduced portion of the roller prevent it moving. A similar reduced portion or groove $b^4$ is provided at the opposite end of the roller to receive a similar key to $m$, when it is engaged with a hydraulic gear for moving it longitudinally. $o$ is the head or tool on the end of the roller $b$, employed for clearing out or scraping the interior of the rough or crude hollow billet, and which takes place in the act of passing the roller $b$ longitudinally through it after it has been placed in the machine and the machine is being made ready to operate upon it. The hydraulic apparatus for withdrawing the upper roller $b$ from the tube and housings and placing it in position therein consists of a hydraulic cylinder $p$ of any known suitable kind and a head $q$ on the end of its ram $p'$, the head being hollow to receive the roller end and having a suitable slot to receive a key similar to $m$ and make the necessary temporary connection between them.

The floor from which the machine is worked is shown by the line marked $s$, the level of which is such that it affords facilities and convenience for manipulating the hollow body or tube $x$.

The action of the machine is as follows: The bearings $b'$ having been moved up and the upper roller $b$ withdrawn by the hydraulic operating-cylinder $p$, the crude hollow billet or body $x$ is taken in a glowing state and placed in position on the top of the roller $a$ between the guide-rollers $f$, which together form a bed or cradle to receive it, as can be seen clearly in Figs. 1, 2, and 5. Then the roller $b$ is moved forward by the cylinder $p$ and its head $o$ inserted into the bore of the billet, and while its—the billet's—outer end is supported against the inner end or surface of the bracket $n$ the head $o$ and roller are pressed longitudinally through it. This act not only threads the roller $b$ through the bore of the billet, but the head or tool $o$, being of a size to scrape the surface of the bore, clears out all scale, cinder, &c., from the interior and prevents it being rolled into the metal in the subsequent rolling operation. When the roller $b$ is in position and held longitudinally, it is disengaged from the hydraulic head $q$, and the bearings $b'$ are brought down by their adjusting-gear, so as to bear on the top of the roller. The guide or supporting rollers $f$ are also moved up to the surface of the body $x$. The lower driven roller $a$ is then set in motion and driven at a high speed, and the steam-blast supplied by the pipe $r$ is also turned on and kept on throughout. Then as the bearings $b$ are pressed down by the attendant operating the hand-wheel $d^3$ the thickness of the billet is reduced and its diameter increased, and as it increases the roller-arms $f'$ are moved back by turning the hand-wheel $k'$, taking with them the rollers, and this is continued until the hollow body or cylinder $x$ is of the required thickness or diameter. During this operation the billet $x$ will have been kept in a position intermediate the bearings $b'$ of the housings or frames $c$ $c'$ by adjusting and regulating the angle of inclination of the roller-supporting shafts $g$ and the rollers $f$ by turning the hand-wheel $j'$ in one or other direction, as may have been required. When the angular position of these rollers necessary for keeping the body $x$ in this intermediate position has been reached, they require no further movement or adjustment during the complete rolling operations. The tubular article under operation having been produced by the high-speed spinning operation in the manner specified in one heat, the bearings $b'$ and their guides $b$ are removed upward out of the way, the back end of the roller $b$ is coupled up with a hydraulic head $q$, and it is withdrawn longitudinally from the cylinder or tube $x$. In the drawings the length of the rollers $a$ $b$ being utilized in connection with the rolling of the body $x$ shown is only about half of their full length, and the intermediate housing or frame $c'$, with its upper bearing $b'$, is adjusted and set on the bed-frames $c^3$, so as to support the roller $b$ near one end of the billet. In the case, however, of longer billets or hollow bodies being operated upon, the frame $c'$ will be shifted toward the right-hand housing $c$. Thus the machine is adapted to deal with and spin tubular bodies or billets, short or long.

Referring now to the machine shown in Figs. 6 to 11, the differences between it and the machine described with reference to Figs. 1 to 5 are those concerning the mode of adjusting the inclination of the shafts carrying the guide-rollers for keeping the billet or body in a position intermediate the frame or housings and the means of adjusting the upper roller. In this modification the parts which are the same as those appearing in Figs. 1 to 5 or parts equivalent in their function or character to those appearing in those figures are marked with the same reference letters. In this machine the shafts $g$ and guide-rollers $f$ have their inclination altered in relation to the vertical plane in lieu of the horizontal plane, as in the case of the machine shown in Figs. 1 to 5; but the action and effect as regards the keeping of the billet or body in the required position are the same. The bearings $g'$ of the shafts, which are the same at both ends of the machine, are carried by vertical trunnions fitting in sockets $g^3$, carried in a transversely-sliding hollow beam or frame $h$. Each of these frames moves in the horizontal plane in a bed $h^3$, its movement being effected by a worm $j$ on the shafting $j^2$, the worm working in a nut $h^2$ in the lower part of the frame $h$. The shafting $j^2$ and worms $j$ of both the beams or frames $h$ are worked by a single hand-wheel $j'$ through the shafts $j^3$ and bevel-wheels $j^4$. The worms $j$ and gearing are so arranged as to move one beam $h$ and its bearings $g'$ in one direction and the other in the opposite direction, and thereby adjust and set the angle of the axes of the rollers $f$ on either side in the required manner. The axial oscillations of the shafts $g$ and the movement of the rollers $f$ away from and up to the billet or cylinder $x$ are effected by worm-wheels $i'$ on the ends of the two shafts $g$, worms $k$ on the shaft $k^2$, and a hand actuating-wheel $k'$. The worms $k$ are adapted to be slid longitudinally on $k^2$ when the frames $h$ are moved by the brackets $h^5$ on $h$. In this modification the end bearings $b'$ in the end frame or housings $c$ are whole rings, the bore of which is of larger diameter than the shaft $b$, as is seen in Fig. 10. With regard to the adjusting means of the bearings $b'$ of the machine, their positive downstroke is effected by hydraulic pressure acting on a piston on the lower part of the threaded rods $b^3$, working in cylinders $t$, disposed between bearing-blocks $b^2$ and the worm-nut wheels $d$. By the wheels $d$ and rod $b^3$ the degree of movement and position of the rods and bearings $b'$ are controlled. The nut worm-wheels $d$ are operated by worms and hand-gear, as in the machine described with reference to Figs. 1 to 5, while pressure for moving them and acting on the roller $b$ is performed by the hydraulic fluid acting on the piston in the cylinder $t$ through the rod $b^3$; but the positive control or governing of the position of the bearings and the shaft $h$ is effected by the nut-wheels $d$ and gearing, as stated.

What is claimed in respect of the herein-described invention is—

1. In a machine for rolling hollow cylinders circularly, and internally and externally, the combination of a large horizontal lower driven roller; an upper small non-driven loose roller directly above the lower roller, for rolling on the internal surface; vertical positive adjusting means, for adjusting the top roller positively and keeping it parallel, in relation to the lower roller; external side-supporting rollers on either side, for supporting the sides of the hollow cylinder, connected together and means for moving said side-supporting rollers simultaneously in oblique and opposite upward directions away from the vertical plane of the machine, in the rolling operation, whereby the side-supporting rollers support the body at parts near the horizontal diametrical plane constantly, as this plane shifts during the increase of diameter of the body; substantially as set forth.

2. In a machine for rolling hollow cylinders circularly, and internally and externally, the combination of a large horizontal lower driven roller; an upper small non-driven loose roller directly above the lower roller, for rolling on the internal surface; vertical positive adjusting means, for adjusting the top roller positively and keeping it parallel in relation to the lower roller; external side-supporting rollers on either side, for supporting the sides of the hollow cylinder, connected together and adapted to be moved simultaneously in oblique and opposite upward directions away from the vertical plane of the machine, in the rolling operation, whereby the cylinder is supported at either side at parts near the horizontal diametrical plane; and means for tilting the axes of said side-supporting rollers; substantially as set forth.

3. In a machine for rolling hollow cylinders circularly, and internally and externally, the combination of a large horizontal lower driven roller; an upper small non-driven loose roller directly above the lower roller, for rolling on the internal surface; vertical positive adjusting means, for adjusting the top roller positively and keeping it parallel, in relation to the lower roller; external side-supporting rollers on either side, for supporting the sides of the hollow cylinder, connected together and adapted to be moved simultaneously in opposite upward directions away from the vertical plane of the machine in the rolling operation, whereby the cylinder is supported at either side; and means for tilting the axes of said side-supporting rollers; substantially as set forth.

4. A machine for rolling cylinders circumferentially, comprising rollers adapted to roll on the interior and exterior surface of the said cylinders, having their axes parallel to one another, one of the said rollers being adjustable in relation to the other, and guide or supporting rollers for supporting the body externally, and means for inclining the axes of the guiding-rollers so as to be inclined in relation to the axes of the rolling-rollers; for the purposes set forth.

5. In a machine for rolling hollow cylinders circumferentially, by peripheral internal and external rolling, supporting-rollers $f$, means whereby said supporting-rollers are caused to act on the exterior of the body being rolled, and to move in an oblique direction outward and away from the rolling-rollers, whereby such body is supported on its opposite sides near the axial plane which lies at right angles to the plane in which the axes of the rolling-rollers lie, as the body increases in diameter; substantially as described.

6. In a machine for rolling hollow cylinders circumferentially by internal and external peripheral rolling, internal and external rolling-rollers, means for causing the internal roller to be moved longitudinally through the bore of the cylinder, and having a tool on the end of said internal roller which passes through the cylinder, adapted to act on the interior surface of the cylinder-billet, when being passed through it; substantially as and for the purposes specified.

7. In a machine for rolling hollow cylinders by peripheral internal and external rolling, lower and upper rollers $a$ $b$, housings or frames $c$ $c'$, and bearings carried thereby, external supporting-rollers $f$, shafts $g$ carrying the rollers $f$, and adjusting means connected with the shafts $g$ by which the inclination of these shafts and rollers $f$ are changed and set as required; substantially as and for the purposes set forth.

8. In a machine for rolling hollow cylinders, internal and external peripheral rolling-rollers, external side-supporting rollers, shafts carrying said supporting-rollers, and movable supports carrying bearings for said shafts and serving to vary the inclination of said shafts, substantially as described.

9. In combination with the large supporting-roller, the roller above the same, the side rollers, the shafts upon which said side rollers are supported and a swinging lever for supporting one end of the said shafts with means for operating the lever to change the inclination of the shafts.

10. In combination, the supporting-roller, a roller centrally arranged above the same, the side rollers to bear upon the outside of the tubes, arms carrying the side rollers, shafts for supporting said arms, said shafts being arranged to turn for adjusting the arms and rollers, swinging levers at one end of the shafts for supporting the same adjustably so that their inclination may be changed and means for turning the shafts to adjust the rollers, substantially as described.

In witness whereof I have hereunto set my hand in presence of two witnesses.

BALFOUR FRASER McTEAR.

Witnesses:
JOHN HINDLEY WALKER,
FRANK E. FLEETWOOD.